US012651365B2

(12) United States Patent
Irshad et al.

(10) Patent No.: US 12,651,365 B2
(45) Date of Patent: Jun. 9, 2026

(54) SYSTEMS AND METHODS FOR SINGLE-SHOT MULTI-OBJECT 3D SHAPE RECONSTRUCTION AND CATEGORICAL 6D POSE AND SIZE ESTIMATION

(71) Applicant: Toyota Research Institute, Inc., Los Altos, CA (US)

(72) Inventors: Muhammad Zubair Irshad, Atlanta, GA (US); Thomas Kollar, San Jose, CA (US); Michael Laskey, Oakland, CA (US); Kevin Stone, San Luis Obispo, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 959 days.

(21) Appl. No.: 17/895,224

(22) Filed: Aug. 25, 2022

(65) Prior Publication Data

US 2023/0077856 A1     Mar. 16, 2023

Related U.S. Application Data

(60) Provisional application No. 63/243,984, filed on Sep. 14, 2021.

(51) Int. Cl.
*G06T 7/70* (2017.01)
*G06T 7/90* (2017.01)

(52) U.S. Cl.
CPC .................. *G06T 7/70* (2017.01); *G06T 7/90* (2017.01); *G06T 2207/30244* (2013.01); *G06T 2207/30248* (2013.01)

(58) Field of Classification Search
CPC ... G06T 7/70; G06T 7/90; G06T 2207/30244; G06T 2207/30248; G06T 7/75;

(Continued)

(56) References Cited

U.S. PATENT DOCUMENTS

| | | | | |
|---|---|---|---|---|
| 12,175,703 | B2 * | 12/2024 | Birchfield | ............ G06N 3/0464 |
| 2024/0046566 | A1 * | 2/2024 | Yang | .................... G06N 3/0464 |

FOREIGN PATENT DOCUMENTS

CN     112562001 A     3/2021

OTHER PUBLICATIONS

Wang, He, et al. "Normalized object coordinate space for category-level 6d object pose and size estimation." Proceedings of the IEEE/CVF conference on computer vision and pattern recognition. 2019. (Year: 2021).*

(Continued)

*Primary Examiner* — Stephen R Koziol
*Assistant Examiner* — Dylan J Sherrillo
(74) *Attorney, Agent, or Firm* — Christopher G. Darrow; Darrow Mustafa PC

(57) ABSTRACT

System, methods, and other embodiments described herein relate to single-shot multi-object three-dimensional (3D) shape reconstruction and categorical six-dimensional (6D) pose and size estimation. In one embodiment, a method includes inferring a heatmap based upon a feature pyramid, where the feature pyramid is generated based upon a red green blue depth (RGB-D) image that includes objects. The method further includes sampling a 3D parameter map at locations corresponding to peaks in the heatmap, where the 3D parameter map is inferred based upon the feature pyramid, and where the locations include latent shape codes, 6D poses, and one-dimensional (1D) scales. The method further includes generating point clouds based upon the latent shape codes, the 6D poses, and the 1D scales.

18 Claims, 4 Drawing Sheets

(58) Field of Classification Search
CPC . G06T 2207/10012; G06T 2207/10021; G06T
2207/10024; G06T 2207/10028; G06T
2207/10048; G06T 2207/20016; G06T
2207/20081; G06T 2207/20084
See application file for complete search history.

(56) References Cited

OTHER PUBLICATIONS

T. Hu, G. Lin, Z. Han and M. Zwicker, "Learning to Generate Dense
Point Clouds with Textures on Multiple Categories," 2021 IEEE
Winter Conference on Applications of Computer Vision (WACV),
Waikoloa, HI, USA, 2021, pp. 2169-2178, doi: 10.1109/WACV48630.
2021.00222. (Year: 2021).*
Wang, He, et al. "Normalized object coordinate space for category-
level 6d object pose and size estimation." Proceedings of the
IEEE/CVF conference on computer vision and pattern recognition.
2019. (Year: 2019).*
Oberweger, M. et al., "Making Deep Heatmaps Robust to Partial
Occlusions for 3D Object Pose Estimation," Computer Vision,
(ECCV), Retrieved from arXiv:1804.03959v3 [cs.CV] Jul. 26,
2018, pp. 119-134, (16 pages).
Xu, Z. et al., "CenterNet Heatmap Propagation for Real-time Video
Object Detection," Computer Vision—ECCV 2020. Lecture Notes
in Computer Science, vol. 12370.https://doi.org/10.1007/978-3-030-
58595-2_14, pp. 1-15 (15 pages).
Yuan, H. et al., "SHREC 2020 track: 6D object pose estimation,"
Eurographics Workshop on 3D Object Retrieval, Retrieved from
arXiv:2010.09355v1 [cs.CV] Oct. 19, 2020, pp. 1-8 (8 pages).

* cited by examiner

SYSTEMS AND METHODS FOR SINGLE-SHOT MULTI-OBJECT 3D SHAPE RECONSTRUCTION AND CATEGORICAL 6D POSE AND SIZE ESTIMATION

CROSS-REFERENCE TO RELATED APPLICATIONS

This application claims the benefit of U.S. Provisional Application No. 63/243,984 titled "SINGLE-SHOT MULTI-OBJECT 3D SHAPE RECONSTRUCTION AND CATEGORICAL 6D POSE AND SIZE ESTIMATION", filed on Sep. 14, 2021, which is herein incorporated by reference in its entirety.

TECHNICAL FIELD

The subject matter described herein relates, in general, to shape reconstruction and pose and size estimation and, more particularly, to simultaneous multi-object three-dimensional (3D) shape reconstruction and six-dimensional (6D) pose and size estimation from one or more images, such as red green blue depth (RGB-D) images or stereo image pairs.

BACKGROUND

Multi-object 3D shape reconstruction and 6D pose (i.e., 3D orientation and position) and size estimation from raw visual observations (e.g., RGB-D images) are important in a variety of technological areas, including robotics manipulation, autonomous navigation of vehicles, and scene understanding. 3D shape reconstruction enables a system to obtain a fine-grained understanding of local geometry, which may be useful in scenarios such as robotics grasping. Furthermore, a system that is able to perform 6D pose estimation in real-time can lead to fast-feedback control.

Some systems are able to perform instance-level 6D pose estimation on an RGB-D image that includes objects, where exact 3D models of the objects and sizes of the objects are known a-priori. However, techniques for instance-level 6D pose estimation tend not to scale well to realistic settings on novel object instances with unknown 3D models, such as settings encountered by a robot and/or vehicle in an environment. For instance, techniques for instance-level 6D pose estimation may not scale well due to variance of objects within a particular category of object.

Some systems are able to perform category-level 6D pose and size estimation (along with shape reconstruction). Such systems tend to employ a two-stage pipeline. In a first stage of the pipeline, a system utilizes two-dimensional (2D) detectors to establish anchors and bounding boxes around each object instance in an RGB-D image. In a subsequent second stage of the pipeline, the system performs object reconstruction and/or 6D pose and size estimation on each object instance separately. The aforementioned two-stage pipeline approach can tend to be computationally expensive, not suitable for real-time use, not scalable, and shows poor performance on real-world novel object instances due to an inability to express explicit representations of shape variations within a category.

SUMMARY

In one embodiment, example systems and methods relate to a manner of improving multi-object 3D shape reconstruction and 6D pose and size estimation from an RGB-D image. According to embodiments, a system obtains an RGB-D image that includes objects. The system extracts, by way of a residual neural network, RGB features and depth features from the RGB-D image. The system generates, by way of a feature pyramid network (FPN) backbone, a feature pyramid based upon a concatenation of the RGB features and the depth features. The system infers, by way of a heatmap head, a heatmap based upon the feature pyramid, where the heatmap includes peaks and non-peaks and where the peaks correspond to centers of the objects in the RGB-D image. The system also infers, by way of a 3D parameter map head, a 3D parameter map, where the 3D parameter map includes pixels, and each pixel includes object-centric 3D information. The system samples the 3D parameter map at locations corresponding to the peaks in the heat map, where the locations include latent shape codes, 6D poses, and one-dimensional (1D) scales corresponding to the objects. The system learns the latent shape codes during a training process of an encoder-decoder network that is trained based upon 3D shapes from a set of computer-aided design (CAD) models, where the encoder-decoder network includes an encoder and a decoder. The system generates point clouds based upon the latent shape codes, the 6D poses, and the 1D scales, where the point clouds are indicative of shapes of the objects, sizes of the objects, and poses (i.e., 6D pose) of the objects. For instance, the system, by way of the decoder, decodes the latent shape codes into initial point clouds and transforms the initial point clouds using the 6D poses and the scales to obtain the point clouds in the world space. The system (or another system) may utilize the point clouds for various purposes, such as in a sim2real pipeline, a real2sim pipeline, or as input to a model that outputs a value used to control a robotic manipulator or vehicle. Unlike other approaches to 3D shape reconstruction and categorical 6D pose and size estimation, the system described above operates in a single pass and does not require using 2D bounding boxes. As such, the system is more computationally efficient than other approaches.

In one embodiment, a computing system for single-shot multi-object three-dimensional (3D) shape reconstruction and categorical six-dimensional (6D) pose and size estimation is disclosed. The computing system includes a processor and memory communicably coupled to the processor. The memory stores instructions that, when executed by the processor, cause the processor to infer a heatmap based upon a feature pyramid, wherein the feature pyramid is generated based upon a red green blue depth (RGB-D) image that includes objects. The instructions further cause the processor to sample a 3D parameter map at locations corresponding to peaks in the heatmap, wherein the 3D parameter map is inferred based upon the feature pyramid, wherein the locations include latent shape codes, 6D poses, and one-dimensional (1D) scales. The instructions further cause the processor to generate point clouds based upon the latent shape codes and transforms these point clouds in the world space using the 6D poses, and the 1D scales.

In one embodiment, a non-transitory computer-readable medium for single-shot multi-object three-dimensional (3D) shape reconstruction and categorical six-dimensional (6D) pose and size estimation and including instructions that, when executed by a processor, cause the processor to infer a heatmap based upon a feature pyramid, wherein the feature pyramid is generated based upon a red green blue depth (RGB-D) image that includes objects is disclosed. The instructions further cause the processor to sample a 3D parameter map at locations corresponding to peaks in the heatmap, wherein the 3D parameter map is inferred based upon the feature pyramid, wherein the locations include latent shape codes, 6D poses, and one-dimensional (1D) scales. The instructions further cause the processor to generate point clouds based upon the latent shape codes and transforms these point clouds in the world space using the 6D poses, and the 1D scales.

In one embodiment, a method is disclosed. The method includes inferring a heatmap based upon a feature pyramid, wherein the feature pyramid is generated based upon a red green blue depth (RGB-D) image that includes objects. The method further includes sampling a 3D parameter map at locations corresponding to peaks in the heatmap, wherein the 3D parameter map is inferred based upon the feature pyramid, and wherein the locations include latent shape codes, 6D poses, and one-dimensional (1D) scales. The method further includes generating point clouds based upon the latent shape codes and transforms these point clouds in the world space using the 6D poses, and the 1D scales.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
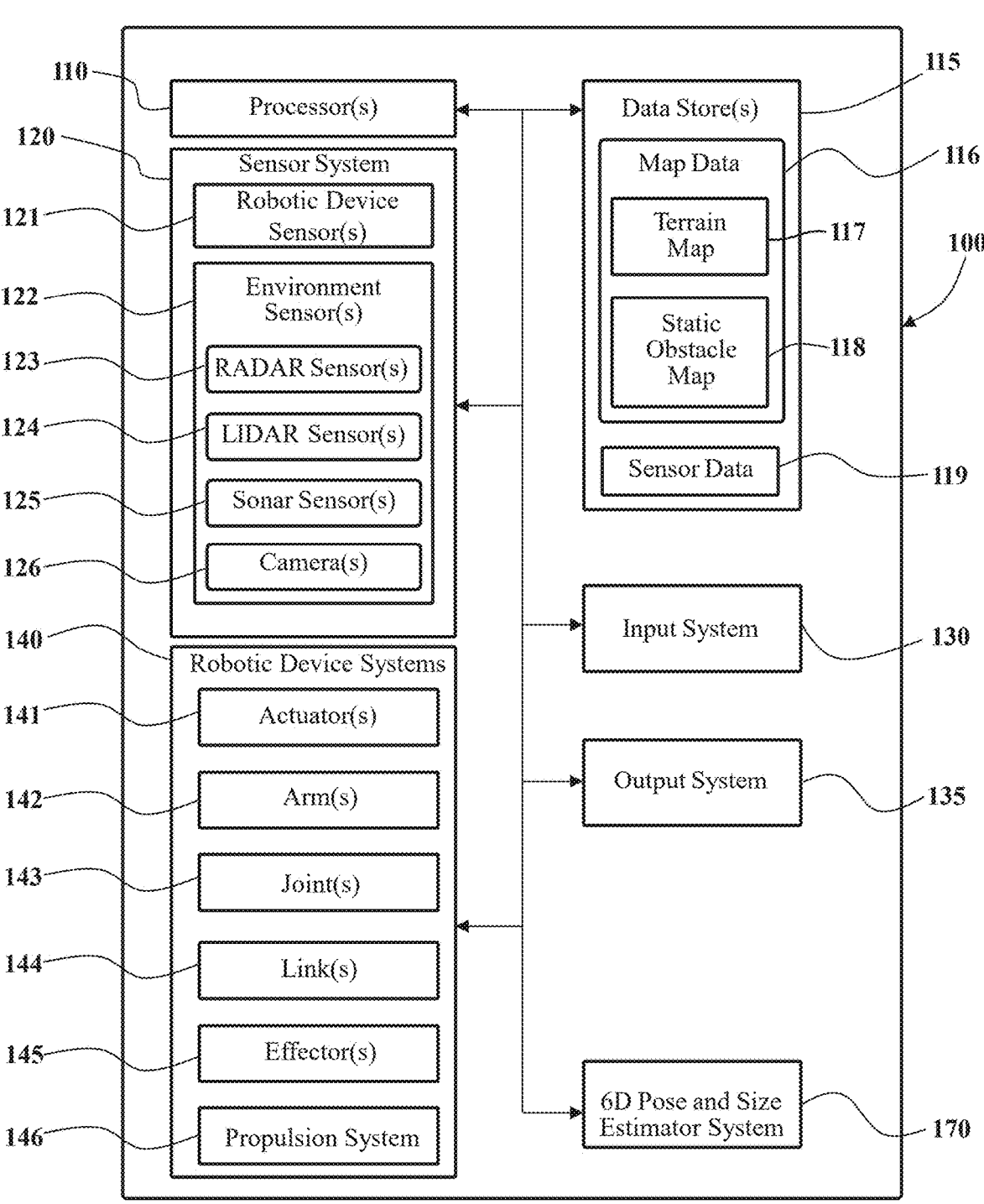
FIG. 1 illustrates one embodiment of a robotic device within which systems and methods disclosed herein may be implemented.

Systems, methods, and other embodiments associated with improving 3D shape reconstruction and 6D pose and size estimation are disclosed herein. As noted above, multi-object 3D shape reconstruction and 6D pose and size estimation from RGB-D images are important for a variety of tasks, such as navigation, robotics manipulation, and scene understanding. For instance, the ability to perform pose estimation in real-time enables fast feedback control and the ability to reconstruct complete 3D shapes enables a fine-grained understanding of local geometry, which can be helpful in tasks such as robotics grasping. Instance-level 6D pose estimation refers to inferring 6D object poses in a scenario in which exact 3D models and sizes of objects are known a-priori. Category-level 6D pose estimation refers to inferring 6D object poses and sizes in a scenario with novel objects instances with unknown 3D models. Some approaches to category-level 6D pose estimation utilize a two-stage pipeline. In a first stage of the pipeline, bounding boxes are established around each object instance in an RGB-D image. In a second stage of the pipeline, each object is reconstructed separately and/or the 6D pose and size of each object is determined separately. The aforementioned two-stage pipeline can be computationally expensive, not scalable, unable to be performed in real-time, and may show poor performance on real-world novel object instances due to an inability to express explicit representations of shape variations within a category.

To address these issues, a 6D pose and size estimator system ("the system") is described herein. The system is configured to perform multi-object 3D shape reconstruction and categorical 6D pose and size estimation in a single-shot approach in a bounding-box free and per-pixel manner. According to embodiments, the system obtains an RGB-D image. The system provides the RGB-D image as input to a residual neural network. The system obtains RGB features and depth features as the output of the residual neutral network, where the RGB features and the depth features are low-resolution spatial feature representations of the RGB-D image. The system concatenates the RGB features and the depth features and provides the concatenated features to an FPN backbone. The system obtains a feature pyramid as the output of the FPN backbone, where the feature pyramid is based upon the concatenated features.

The system infers a heatmap based upon the feature pyramid. In an example, the system provides the feature pyramid as input to a heatmap head. The system obtains a heatmap as an output of the heatmap head, where the heatmap is based upon the feature pyramid. The system identifies peaks in the heatmap, where each peak corresponds to a center of an object in the RGB-D image. The system also infers a 3D parameter map based upon the feature pyramid. The system samples the 3D parameter map at locations corresponding to the peaks in the heatmap. The locations include shape codes, 6D poses, and 1D scales corresponding to the objects. The latent shape codes have been generated by way of an encoder-decoder network that is trained based upon 3D shapes from a set of computer-aided design (CAD) models.

The system generates point clouds based upon the latent shape codes, the 6D poses, and the 1D scales from the locations in the 3D parameter map, where the point clouds are indicative of shapes, sizes, and poses (i.e., 6D pose) of the objects in the RGB-D image. For instance, the system provides the latent shapes codes (obtained via sampling of the 3D parameter map) for each of the objects as input to a decoder of the encoder-decoder network. The system obtains initial point clouds for the objects as the output of the decoder. The system transforms the initial point clouds using the 6D poses and the 1D scales from the locations in the 3D parameter map to obtain the point clouds. According to some embodiments, a robotic device, such as a robotic manipulator, a robot that can perform household/industrial tasks, or an autonomous vehicle, is controlled based on the point clouds. According to some embodiments, the point clouds are used in a sim2real or sim2real pipeline. In an example, the system (or another system) utilizes the point clouds in a computer simulation to represent simulated versions of the objects in the RGB-D image. The system trains a machine learning model based upon the computer simulation. A real-world robotic device may then use the machine learning model to navigate about a real-world environment. According to some embodiments, textures and/or meshes are applied to the point clouds to recreate simulated versions of the objects in the RGB-D image.

The above-described technologies present various advantages over some approaches to 3D shape reconstruction and 6D pose and size estimation. First, unlike the aforementioned approach to multi-object 3D shape reconstruction and 6D pose and size estimation, which use a two-stage pipeline (bounding box detection using anchors and disjoint shape reconstruction and pose and size estimation), the above-described technologies utilize a single shot-approach that optimizes complete 3D information (3D shape and 6D pose) by considering object instances as centers. As such, the above-described technologies may operate in real-time (e.g., at 40 frames per second (FPS), whereas other approaches may not operate in real-time (e.g., 5 FPS). Second, the latent shape codes described above enable variations within an object category to be explicitly captured, and hence enable the above-described technologies to more accurately estimate 3D shape and 6D pose and size in comparison to other methods. Third, unlike other approaches that perform 3D shape reconstruction and 6D pose and size estimation for each object in an RGB-D image separately, the above-described technologies can perform simultaneous 3D shape reconstruction and 6D pose and size estimation.

Referring to FIG. 1, an example of a robotic device 100 is illustrated. As used herein, a "robotic device" is a device that can perform specific tasks with reduced or no human intervention. As such, the robotic device 100 can take any one of a number of different forms, such as a robotic manipulator, semi-autonomous/autonomous vehicle, or any other device that can perform tasks with reduced or no human intervention. In one or more implementations, the robotic device 100 may include sensors to perceive aspects of the surrounding environment and thus benefits from the functionality discussed herein associated with improving 3D shape reconstruction and 6D pose and size estimation.

The robotic device 100 also includes various elements. It will be understood that in various embodiments, it may not be necessary for the robotic device 100 to have all of the elements shown in FIG. 1. The robotic device 100 can have any combination of the various elements shown in FIG. 1. Further, the robotic device 100 can have additional elements to those shown in FIG. 1. In some arrangements, the robotic device 100 may be implemented without one or more of the elements shown in FIG. 1. While the various elements are shown as being located within the robotic device 100 in FIG. 1, it will be understood that one or more of these elements can be located external to the robotic device 100. Further, the elements shown may be physically separated by large distances. For example, as discussed, one or more components of the disclosed system can be implemented within the robotic device 100 while further components of the system are implemented within a cloud-computing environment or another system that is remote from the robotic device 100.

Some of the possible elements of the robotic device 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. However, those skilled in the art will understand that the embodiments described herein may be practiced using various combinations of these elements. In either case, the robotic device 100 includes a 6D pose and size estimator system 170 that is implemented to perform methods and other functions as disclosed herein relating to improving 3D shape reconstruction and 6D pose and size estimation for multiple objects in an RGB-D image. As will be discussed in greater detail, the 6D pose and size estimator system 170, in various embodiments, is implemented partially within the robotic device 100 and as a cloud-based service. For example, in one approach, functionality associated with at least one module of the 6D pose and size estimator system 170 is implemented within the robotic device 100, while further functionality is implemented within a cloud-based computing system.

Figure 2:
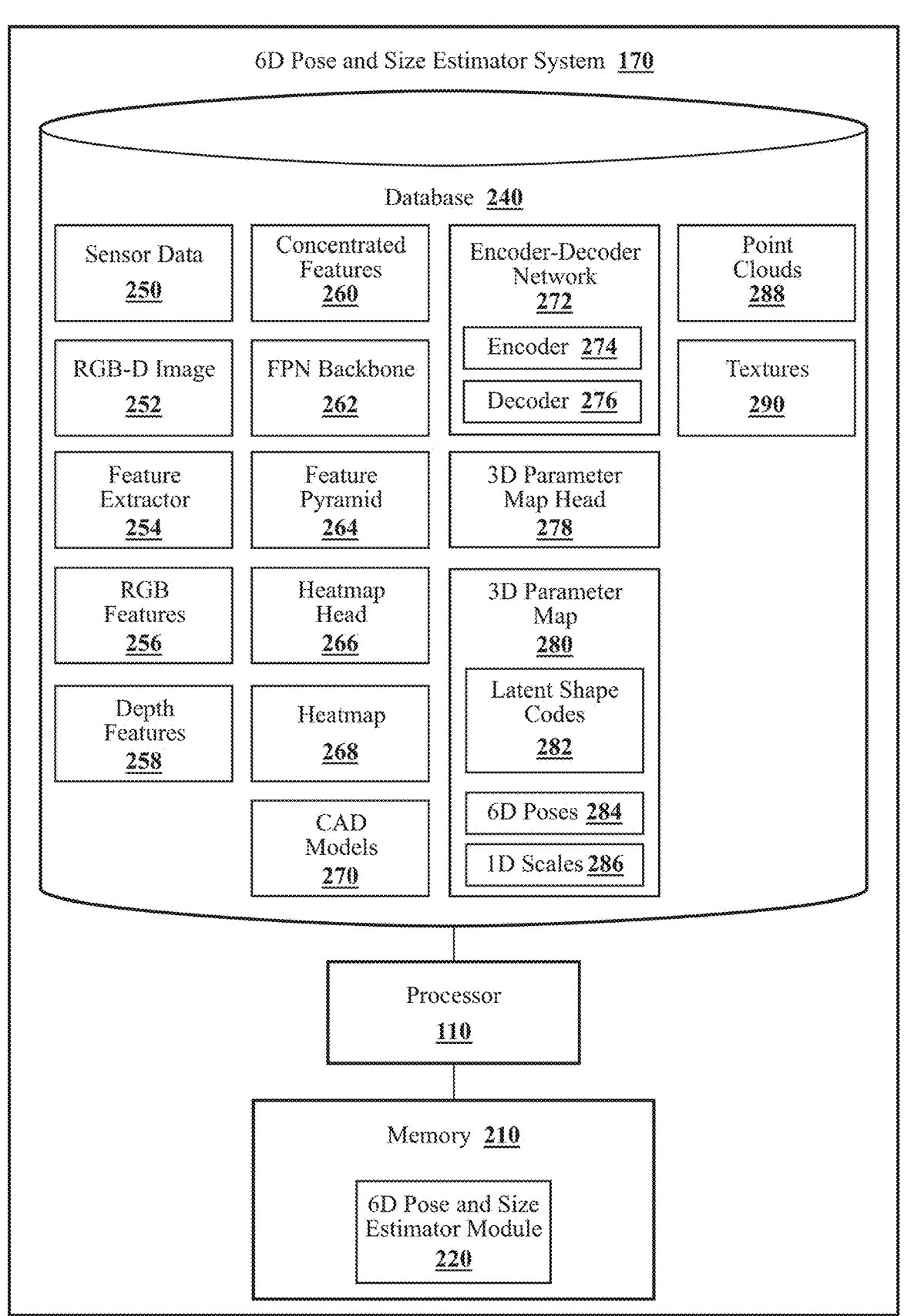
FIG. 2 illustrates one embodiment of a system that is associated with 6D pose and size estimation.

With reference to FIG. 2, one embodiment of the 6D pose and size estimator system 170 of FIG. 1 is further illustrated. The 6D pose and size estimator system 170 includes a processor(s) 110 from the robotic device 100 of FIG. 1. Accordingly, the processor(s) 110 may be a part of the 6D pose and size estimator system 170. The 6D pose and size estimator system 170 may include a separate processor from the processor(s) 110 of the robotic device 100 or the 6D pose and size estimator system 170 may access the processor(s) 110 through a data bus or another communication path.

In one embodiment, the 6D pose and size estimator system 170 includes a memory 210 that stores a 6D pose and size estimator module 220. The memory 210 is a random-access memory (RAM), read-only memory (ROM), a hard-disk drive, a flash memory, or other suitable memory for storing the 6D pose and size estimator module 220. The 6D pose and size estimator module 220 is, for example, computer-readable instructions that, when executed by the processor(s) 110, cause the processor(s) 110 to perform the various functions disclosed herein.

The 6D pose and size estimator system 170 may be implemented between the robotic device 100 and a cloud-computing environment. The 6D pose and size estimator system 170 may be embodied at least in part within a cloud-computing environment. According to some embodiments, the 6D pose and size estimator system 170 is embodied entirely within the cloud-computing environment.

With reference to FIG. 2, the 6D pose and size estimator module 220 generally includes instructions that function to control the processor(s) 110 to receive data inputs. The data inputs may be from one or more sensors (e.g., sensors of the robotic device 100). The inputs are, in one embodiment, observations of one or more objects in an environment proximate to the robotic device 100 and/or other aspects about the surroundings. As provided for herein, the 6D pose and size estimator module 220, in one embodiment, acquires sensor data 250 that includes RGB-D images.

In general, the 6D pose and size estimator module 220 is configured to simultaneously detect, reconstruct, and localize objects in a 3D space given an RGB-D image as input. The 6D pose and size estimator module 220 regards shape reconstruction and pose and size estimation as a point-based representation problem, where complete 3D information of each object is represented by a center point of each object in a 2D spatial image. Stated formally, given an RGB-D image ($I \in \mathbb{R}^{h_0=w_0 \times 3}$, $D \in \mathbb{R}^{h_0 \times w_0}$), of width $w_0$ and height $h_0$, the 6D pose and size estimator module 220 reconstructs complete point clouds ($P \in \mathbb{R}^{K \times N \times 3}$) and infers 6D poses ($\widetilde{\mathcal{P}} \in SE(3)$) and scales ($\hat{s} \in \mathbb{R}^3$) for each object in the RGB-D image, where K is a number of objects in the RGB-D image and where N is the number of points in the (reconstructed) complete point clouds.

The 6D pose $\widetilde{\mathcal{P}} \in SE(3)$ of each object is denoted by a 3D rotation $\hat{\mathcal{R}} \in SO(3)$ and a translation $\hat{t} \in \mathbb{R}^3$. The 6D pose, along with 3D size (obtained from canonical point clouds P, that is, point clouds that are 3D shape normalized to fit in a unit cube and that are centered at origin) and 1D scales $\hat{s}$ completely define each object instance in 3D space with respect to a camera coordinate frame.

In general, the 6D pose and size estimator module 220 is configured to detect objects in an RGB-D image in a per-pixel manner using a detection backbone that is based on feature pyramid networks, for example, a Resnet18-FPN backbone. Second, the 6D pose and size estimator module 220 predicts a joint shape, pose, and size code denoted by object-centric 3D parameter maps for each object using specialized heads. Third, the 6D pose and size estimator module 220 utilizes two-dimensional heatmaps. The (object-centric) 3D parameter maps are jointly optimized to predict shapes, poses, and sizes of the objects in a single forward pass.

In addition to locations of surrounding objects, the sensor data 250 may also include, for example, information about visual indicators, lane markings, and so on. Moreover, in one embodiment, the 6D pose and size estimator module 220 controls the sensors to acquire the sensor data 250 about an area that encompasses 360 degrees about the robotic device 100 to comprehensively assess the surrounding environment. Of course, in alternative embodiments, the 6D pose and size estimator module 220 may acquire the sensor data 250 about a forward direction alone when, for example, the robotic device 100 is not equipped with further sensors to include additional regions about the robotic device 100 and/or the additional regions are not scanned due to other reasons (e.g., unnecessary due to known current conditions).

Moreover, in one embodiment, the 6D pose and size estimator system 170 includes the database 240. The database 240 is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the database 240 stores data used by the 6D pose and size estimator module 220 in executing various functions. In one embodiment, the database 240 includes the sensor data 250 along with, for example, metadata that characterizes various aspects of the sensor data 250. For example, the metadata can include location coordinates (e.g., longitude and latitude), relative map coordinates or tile identifiers, time/date stamps from when the separate sensor data 250 was generated, and so on.

According to embodiments, the database 240 includes an RGB-D image 252. In an example, the RGB-D image 252 is captured by an RGB-D camera of the robotic device 100. The RGB-D image 252 may include multiple objects, and the multiple objects may be of the same or different types. The RGB-D image 252 comprises an RGB component and a depth component. In an example, the RGB-D image 252 includes objects that surround the robotic device 100.

The database 240 further includes a feature extractor 254, RGB features 256, and depth features 258. According to embodiments, the feature extractor 254 comprises a residual neural network (ResNet) that comprises a first stem and a second stem, where the first stem extracts the RGB features 256 from the RGB-D image 252 and where the second stem extracts the depth features 258 from the RGB-D image 252. According to embodiments, the database 240 further includes concatenated features 260, where the concatenated features 260 are a concatenation of the RGB features 256 and the depth features 258.

According to embodiments, the database 240 includes an FPN backbone 262 and a feature pyramid 264. The FPN backbone 262 is configured to generate the feature pyramid 264 based upon the RGB features 256, and the depth features 258 (or the concatenated features 260).

According to embodiments, the database 240 includes a heatmap 266 and a heatmap 268. The heatmap head 266 is generally configured to infer the heatmap 268 based upon the feature pyramid 264. According to embodiments, the heatmap head 266 comprises a convolutional neural network (CNN). The heatmap 268 comprises peaks and non-peaks, where the peaks correspond to centers of objects in the RGB-D image 252. With more particularity, the heatmap 268 comprises peak values corresponding to the peaks and non-peak values corresponding to the non-peaks.

According to embodiments, the database 240 includes CAD models 270. The CAD models 270 comprise points indicative of different 3D shapes (e.g., cars, buses, bicycles, pedestrians, airplanes, beds, benches, chairs, sofas, bookshelves, etc.). The CAD models 270 also include ground-truth 6D pose and scales for each of the different 3D shapes. According to embodiments, the CAD models 270 are not accessible by the 6D pose and size estimator module 220 at inference time.

According to embodiments, the database 240 includes an encoder-decoder network 272 that is trained based upon data from the CAD models 270. According to embodiments, the encoder-decoder network 272 is representation-invariant and can be utilized with any shape representation. The encoder-decoder network 272 comprises an encoder 274 and a decoder 276. The encoder 274 is generally configured to output a latent shape code based upon points from a CAD model in the CAD models 270. The latent shape code is a latent representation of a shape represented by the CAD model. According to embodiments, the latent shape code is a 128-dimensional vector. The decoder 276 is generally configured to reconstruct a point cloud based upon the latent shape code, where the point cloud represents the shape represented by the CAD model. According to embodiments, the decoder 276 comprises a multilayer perceptron (MLP). According to embodiments, the decoder 276 comprises three fully connected layers.

According to embodiments, the database 240 includes a 3D parameter map head 278 and a 3D parameter map 280. The 3D parameter map head 278 is generally configured to infer the 3D parameter map 280 based upon the feature pyramid 264. According to embodiments, the 3D parameter map head 278 comprises an MLP. The 3D parameter map 280 comprises pixels, where each pixel includes complete object-centric 3D information (described in greater detail below). The 3D parameter map 280 comprises latent shape codes 282, 6D poses 284, and 1D scales 286 (described below). The 6D poses 284 comprise translation vectors and rotation matrices.

According to embodiments, the database 240 includes point clouds 288, where the point clouds 288 indicate shapes, sizes, and poses (i.e., 6D pose) of the objects in the RGB-D image 252. Generation of the point clouds 288 by the 6D pose and size estimator module 220 is discussed in greater detail below.

According to embodiments, the database 240 includes textures 290 (and/or meshes). The 6D pose and size estimator module 220 may apply the textures 290 (and/or the meshes) to the point clouds 288 to generate simulated versions of the objects in the RGB-D image 252.

Figure 3:
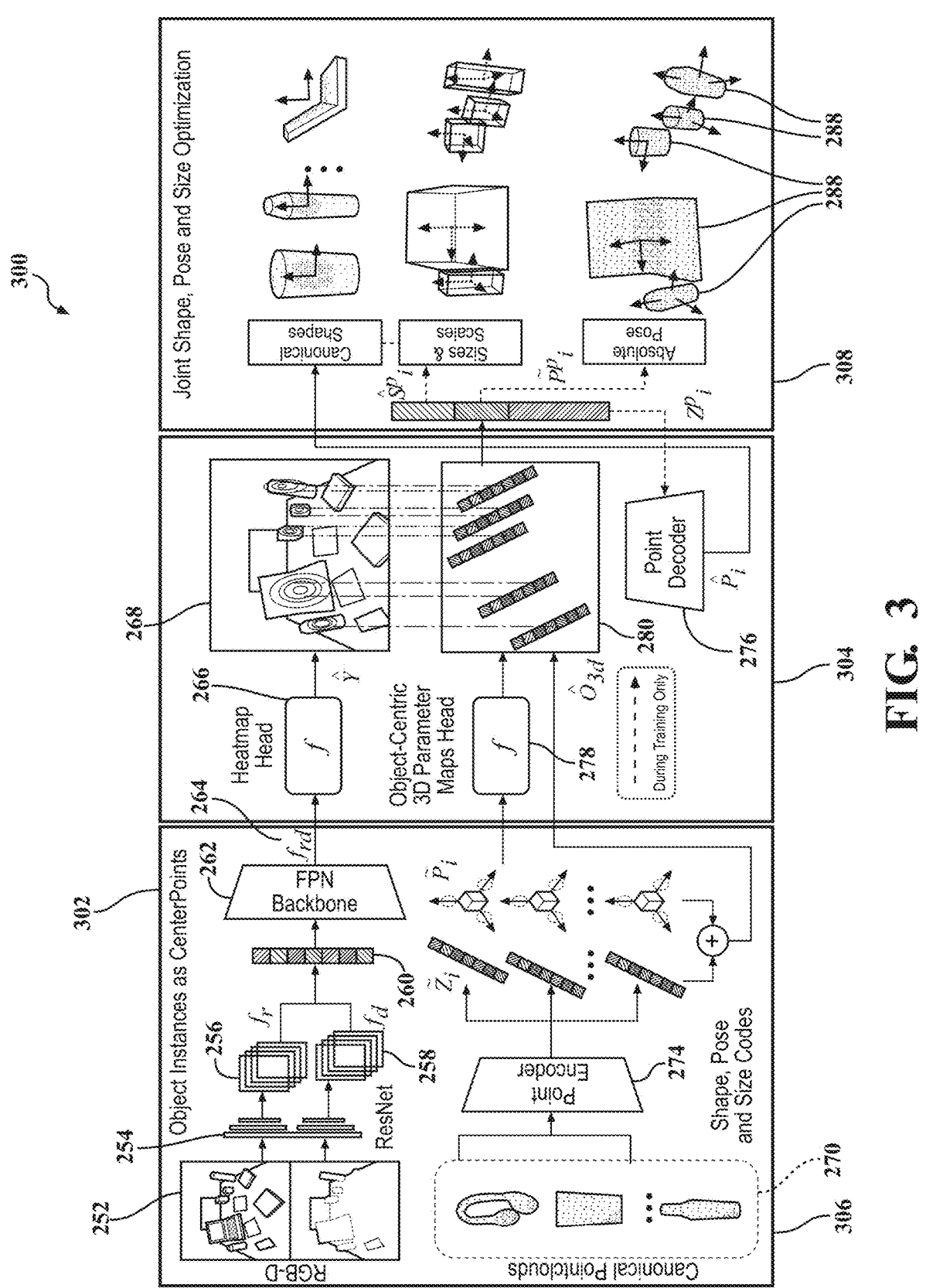
FIG. 3 illustrates an example high-level overview of the processes performed by the system in FIG. 2.

FIG. 3 illustrates an example high-level overview of a process 300 performed by the 6D pose and size estimator system 170. Referring jointly now to FIGS. 2 and 3, an example operation of the 6D pose and size estimator system 170 is set forth.

Referring to box 302 of FIG. 3, the 6D pose and size estimator module 220 is configured to represent each object in the RGB-D image 252 by a respective 2D location. For instance, given the RGB-D image 252 ($I \in \mathbb{R}^{h_0 \times w_0 \times 3}$, $D \in \mathbb{R}^{h_0 \times w_0}$) where I is an RGB component of the RGB-D image 252 and D is a depth component of the RGB-D image 252, the 6D pose and size estimator module 220 generates, by way of the feature extractor 254, the RGB features 256 ($f_r \in \mathbb{R}^{h_0/4 \times w_0/4 \times C_s}$) and the depth features 258 ($f_d \in \mathbb{R}^{h_0/4 \times w_0/4 \times C_s}$) where $C_s$ is a number of convolutional channels, such as thirty-two. For instance, the 6D pose and size estimator module 220 provides the RGB-D image 252 as input to the feature extractor 254 and obtains the RGB features 256 ($f_r$) and the depth features 258 ($f_d$) as output of the feature extractor 254. In general, the RGB features 256 and the depth features 258 are low-resolution spatial feature representations of the RGB-D image 252. According to embodiments, the feature extractor 254 comprises a residual neural network (ResNet). According to embodiments, the residual neural network comprises a first stem and a second stem, where the first stem generates the RGB features 256 based upon the RGB-D image 252 and where the second stem generates the depth features 258 based upon the RGB-D image 252.

The 6D pose and size estimator module 220 generates, by way of the FPN backbone 262, the feature pyramid 264 based upon the RGB features 256 ($f_r$) and the depth features 258 ($f_d$). According to embodiments, the 6D pose and size estimator module 220 concatenates the RGB features 256 ($f_r$) and the depth features 258 ($f_d$) along a convolutional channel dimension to generate the concatenated features 260. According to embodiments, the 6D pose and size estimator module 220 provides the concatenated features 260 as input to the FPN backbone 262 and obtains the feature pyramid 264 ($f_{rd}$) as output of the FPN backbone 262. According to embodiments, the feature pyramid 264 has scales ranging from ⅛ to ½ resolution, where each level of the feature pyramid 264 has the same channel dimension, such as sixty-four.

Referring now to box 304, the 6D pose and size estimator module 220 predicts, by way of the heatmap head 266, the heatmap 268 ($\hat{Y} \in$ $$[0,1]^{\frac{h_0}{R} \times \frac{w_0}{R} \times 1})$$

based upon the feature pyramid 264, where R is a down-sampling factor, such as eight. For instance, the 6D pose and size estimator module 220 provides the feature pyramid 264 as input to the heatmap head 266 and obtains the heatmap 268 as output of the heatmap head 266. The heatmap 268 comprises values, where some values represent peaks and some values represent non-peaks. The peaks in the heatmap 268 correspond to centers of the objects in the RGB-D image 252.

In general, the heatmap head 266 merges semantic information from each level of the feature pyramid 264 into one output ($\hat{Y}$), that is, the heatmap 268. The heatmap 268 captures multi-scale information and encodes features at a higher resolution for effective reasoning at a per-pixel level. According to embodiments, the 6D pose and size estimator module 220 generates the heatmap 268 by performing three up-sampling steps on the feature pyramid 264, followed by an element-wise sum and, followed by applying a softmax function. According to embodiments, the heatmap head 266 is trained to predict ground truth heatmaps (Y) by minimizing mean squared error loss ($\mathcal{L}_{inst}$) according to equation (I) below:

$$\mathcal{L}_{inst} = \sum_{xyg} (\hat{Y} - Y)^2 \tag{I}$$

According to embodiments, the 6D pose and size estimator module 220 computes the ground truth heatmaps (Y) by using ground-truth center-points (c in $\mathbb{R}^2$) for all objects in the RGB-D image 252 using a gaussian kernel. The Gaussian kernel ($Y_{xyg}$) of each center in the ground truth heatmaps (Y) is relative to the scale-based standard deviation (a) of each object in the RGB-D image 252. More specifically, the Gaussian kernel, set forth below in the equation (II) below, of each center in the ground truth heat maps (Y) is relative to the scale-based deviation (σ) of each object.

$$Y_{xyg} = \exp(-\frac{(x-c_x)^2 + (y-c_y)^2}{2\sigma^2}) \tag{II}$$

Referring now to box 306, during a training stage, the 6D pose and size estimator module 220 represents complete object-based 3D information (i.e., point clouds (P), 6D pose ($\widetilde{P}$), and scale ($\hat{s}$)) as (object-centric) 3D parameter maps ($O_{3d} \in \mathbb{R}^{h_0 \times w_0 \times 141}$). $O_{3d}$ comprises latent shape codes, 6D poses, and scales. The (object-centric) 3D parameter maps store a point cloud representation for each object as a latent shape code ($z_1 \in \mathbb{R}^{128}$). According to embodiments, the 6D pose and size estimator module 220 represents ground truth pose ($\widetilde{P}$) by a 3×3 rotation ($\hat{R} \in SO(3)$) and a translation ($\hat{t} \in \mathbb{R}^3$). According to embodiments, the 6D pose and size estimator module 220 stores the rotation, the translation, and a 1D scale ($\hat{s}$) in $O_{3d}$ as thirteen-dimensional vectors.

During the training stage, the 6D pose and size estimator module 220 trains the encoder-decoder network 272 to learn latent shape codes for shapes represented in the CAD models 270. The encoder 274 ($g_\phi$) takes points from a CAD model in the CAD models 270 as input and outputs a latent shape code based upon the points, where the latent shape code encodes 3D shape information pertaining to a shape represented by the points. The decoder 276 ($d_\theta$) takes the latent shape code ($z_i$) as input and reconstructs a point cloud ($\hat{P}_i$) represented by a CAD model in the CAD models 270 according to equation (III) below:

$$\hat{P}_i = d_\theta(g_\phi(P_i)) \tag{III}$$

According to embodiments, the 6D pose and size estimator module 220 samples points (e.g., 2048 points) from each of the CAD models 270 to use as ground-truth shapes. According to embodiments, prior to or subsequent with training the encoder-decoder network 272, the 6D pose and size estimator module 220 unit-canonicalizes each of the sampled points by applying a scaling transform to the points such that a shape represented by the points is centered at an origin and is unit normalized. The 6D pose and size estimator module 220 then trains the encoder-decoder network 272. According to embodiments, the 6D pose and size estimator module 220 freezes the decoder 276 after training. According to embodiments, 6D pose and size estimator module 220 optimizes the encoder-decoder network 272 using reconstruction error denoted by chamfer-distance according to equation (IV) below.

$$D_{cd}(P_i, \hat{P}_i) = \frac{1}{|P_i|} \sum_{x \in P_i} \min_{y \in \hat{P}_i} \|x - y\|_2^2 + \frac{1}{|\hat{P}_i|} \sum_{y \in \hat{P}_i} \min_{x \in P_i} \|x - y\|_2^2 \tag{IV}$$

Referring back to box 304, the 6D pose and size estimator module 220 infers, by way of the 3D parameter map head 278, a 3D parameter map ($\hat{O}_{3d}$) based upon the feature pyramid 264 ($f_{rd}$), where the 3D parameter map defines each object instance completely in 3D space. During training, the 3D parameter map head 278 outputs a 3D parameter map ($\hat{O}_{3d} \in$ $$\mathbb{R}^{\frac{h_0}{R} \times \frac{w_0}{R} \times 141}),$$

where R is a down-sampling factor and where each pixel in the down-sampled $$(\frac{h_0}{R} \times \frac{w_0}{R})$$

map contains complete object-centric 3D information (i.e., the latent shape code $z_i$, the 6D pose $\tilde{P}$, and the scale $\hat{s}$) as 141-D vectors. In an example, R is eight.

According to embodiments, the choice of rotation representation ($\hat{R} \in SO(3)$) for the 6D pose $\tilde{P}$ is determined by stability during training as neural networks can fit continuous representations better than other representations. According to embodiments, the predicted 3×3 rotation $\hat{R}$ is projected into SO(3) according to equation (V) below:

$$SVD^+(\hat{R}) = U\in' V^T, \text{where } \in' = \text{diag}(1,1,\det(UV^T)) \quad (V)$$

According to embodiments, the 6D pose and size estimator module 220 utilizes a rotation map function for use with symmetric objects that maps ambiguous ground-truth rotations to a single canonical rotation by normalizing pose rotation.

According to embodiments, the 6D pose and size estimator module 220 jointly optimizes the 3D parameter map ($\hat{O}_{3d}$) using a masked Huber-loss, where the Huber-loss is enforced when gaussian heatmaps (Y) have a score greater than 0.3 to prevent ambiguity in spatial space where no objects exist. The 6D pose and size estimator module 220 computes the masked Huber-loss ($\mathbb{R}_{3D}$) according to equation (VI) below:

$$\mathcal{L}_{3D}(O_{3D}, \hat{O}_{3d}) = \begin{cases} \frac{1}{2}(O_{3d} - \hat{O}_{3d})^2, & \text{if } |O_{3d} - \hat{O}_{3d}| < \delta \\ \delta((O_{3d} - \hat{O}_{3d}) - \frac{1}{2}\delta), & \text{otherwise} \end{cases} \quad (VI)$$

According to embodiments, the 6D pose and size estimator module 220 computes ground-truth 3D parameter maps ($O_{3d}$) using the Gaussian kernel $Y_{xyg}$ described above.

According to embodiments, the 6D pose and size estimator module 220 integrates an auxiliary depth reconstruction loss ($\mathbb{R}_D$) for effective sim2real transfer, where $\mathbb{R}_D$ (D, $\hat{D}$) minimizes Huber-loss between a target depth (D) and a predicted depth ($\hat{D}$) output by the 3D parameter map head 278. According to embodiments, the auxiliary depth reconstruction loss encourages learning of geometric features by reconstructing artifact-free depth. According to embodiments, the 6D pose and size estimator module 220 preprocesses input synthetic RGB-D images during training to contain noise and random eclipse dropouts to enforce the auxiliary depth reconstruction loss.

Referring now to box 308, according to embodiments, 6D pose and size estimator module 220 jointly optimizes for detection, reconstruction, and localization. For instance, the 6D pose and size estimator module 220 minimizes a loss ($\mathbb{R}$) that is a combination of heatmap instance detection loss ($\mathcal{L}_{inst}$), object-centric 3D map prediction loss ($\mathcal{L}_{O_{3d}}$), and auxiliary depth reconstruction loss ($\mathcal{L}_D$) according to equation (VII) below:

$$\mathcal{L} = \lambda_I \mathcal{L}_{inst} + \lambda_{O_{3d}} \mathcal{L}_{O_{3d}} + \lambda_d \mathcal{L}_D \quad (VII)$$

In equation (VII), $\lambda_I$, $\lambda_{O_{3d}}$, and $\lambda_d$ are weighting coefficients with empirically determined values. According to embodiments, $\lambda_I$ is 100, $\lambda_{O_{3d}}$ is 1.0, and $\lambda_d$ is 1.0.

According to embodiments, at inference, the 6D pose and size estimator module 220 obtains the RGB-D image 252. It is contemplated that the RGB-D image 252 includes multiple objects, although the RGB-D image 252 may include only one object. The 6D pose and size estimator module 220 provides the RGB-D image 252 as input to the feature extractor 254. The 6D pose and size estimator module 220 obtains the RGB features 256 and the depth features 258 as the output of the feature extractor 254. The 6D pose and size estimator module 220 generates the concatenated features 260 based upon the RGB features 256 and the depth features 258. The 6D pose and size estimator module 220 provides the concatenated features 260 as input to the FPN backbone 262. The 6D pose and size estimator module 220 obtains the feature pyramid 264 as output of the FPN backbone 262.

The 6D pose and size estimator module 220 provides the feature pyramid 264 as an input to the heatmap head 266. The heatmap head 266 predicts the heatmap 268 based upon the feature pyramid 264. The 6D pose and size estimator module 220 obtains the heatmap 268 ($\hat{Y}$) as the output of the heatmap head 266. The 6D pose and size estimator module 220 identifies peaks in the heatmap 268, where the peaks correspond to centers (i.e., center points) of the objects in the RGB-D image 252. The center points of the objects are given by equation (VIII) below:

$$c_i \text{in} \mathbb{R}^2 = (x_i, y_i)$$

According to embodiments, the 6D pose and size estimator module 220 associates heatmap probabilities at the centers ($c_i$) as detection confidence according to equation (IX) below:

$$cf_{c_i} = \hat{Y}_{x_i y_i} \quad (IX)$$

According to embodiments, the centers are local maxima in the heatmap 268. According to embodiments, the 6D pose and size estimator module 220 performs non-maximum suppression on the local maxima in the heatmap 268 using a 3×3 max-pooling operation.

The 6D pose and size estimator module 220 provides the feature pyramid 264 as an input to the 3D parameter map head 278. The 3D parameter map head 278 infers the 3D parameter map 280 based upon the feature pyramid 264. The 6D pose and size estimator module 220 obtains the 3D parameter map 280 as the output of the 3D parameter map head 278. The 6D pose and size estimator module 220 samples the object 3D map for each individual object (represented in the RGB-D image 252) from the 3D parameter map 280 ($\hat{O}_{3d}$) at each center location ($c_i$) via $\hat{O}_{3d}(x_i, y_i)$. Stated differently, the 6D pose and size estimator module 220 samples the 3D parameter map 280 at locations corresponding to peaks in the heatmap 268, where the locations include the latent shape codes 282, the 6D poses 284, and the 1D scales 286.

The 6D pose and size estimator module 220 generates the point clouds 288 based upon the latent shape codes 282, the 6D poses 284, and the 1D scales 286 obtained from sampling the 3D parameter map 280 at the locations corresponding to the peaks in the heatmap 268. The point clouds 288 indicate the shapes, sizes, and poses (i.e., 6D pose) of the objects in the RGB-D image 252.

According to embodiments, the 6D pose and size estimator module 220 extracts the latent shape codes 282 from the locations corresponding to centers of the objects in the 3D parameter map 280. The 6D pose and size estimator module 220 provides the latent shape codes 282 as input to the (frozen) decoder 276 of the encoder-decoder network 272. The decoder 276 reconstructs initial point clouds ($P_i$) according to equation (X) below:

$$P_i = d_\theta(z_i) \tag{X}$$

According to embodiments, the 6D pose and size estimator module 220 extracts the 6D poses (i.e., the 3×3 rotation $\mathcal{R}_i$ and the translation vector $\hat{t}_i$) for each object and the 1D scales ($\hat{s}_i$) from the locations corresponding to centers of the objects in the 3D parameter map 280. The 6D pose and size estimator module 220 transforms the initial point clouds based upon the 6D poses and the 1D scales to obtain the point clouds $$\left(P^i_{recon}\right)$$

according to equation (XI) below:

$$P_{recon}{}^i = [R_i|t_i] * s_i * P_i \tag{XI}$$

In equation (XI) above, $R_i$ is a 3×3 rotation matrix, $t_i$ is a 3D translation vector, and $s_i$ is a 1D scale. As reflected in equation (XI) above, the 6D pose and size estimator module 220 multiplies points in the initial point clouds ($P_i$) by respective translation vectors, respective rotation matrices ($R_i$), and respective 1D scales ($s_i$) to generate the point clouds 288

$$\left(P^i_{recon}\right).$$

According to some embodiments, the point clouds 288 are utilized by the robotic device 100 to navigate about an environment. For instance, the 6D pose and size estimator module 220 can provide the point clouds 288 to a processor(s) 110, which can cause the robotic device 100 to operate based upon the point clouds 288. According to some embodiments, the point clouds 288 are utilized in a sim2real pipeline or a real2sim pipeline. In an example, the point clouds 288 (which are indicative of shapes, sizes, and poses of objects) are used to train a machine learning model.

According to some embodiments, the 6D pose and size estimator system 170 (or another system) utilizes the point clouds 288 in a computer simulation of an environment, where the point clouds 288 represent simulated versions of the objects in the RGB-D image 252. The 6D pose and size estimator system 170 (or another system) trains a machine learning model based upon the computer simulation, real-world data, or a combination of both. For instance, as the 6D poses of the simulated versions of the objects are known, the 6D pose and size estimator system 170 (or another system) can realistically manipulate the simulated version of the objects within the computer simulation. A real-world robotic device (e.g., the robotic device 100) can utilize the machine learning model to navigate about a real-world environment. According to some embodiments, the 6D pose and size estimator module 220 applies the textures 290 (and/or meshes) to the point clouds 288 to generate reconstructed versions of the objects in the RGB-D image 252 (which may also be utilized in the aforementioned computer simulation).

Figure 4:
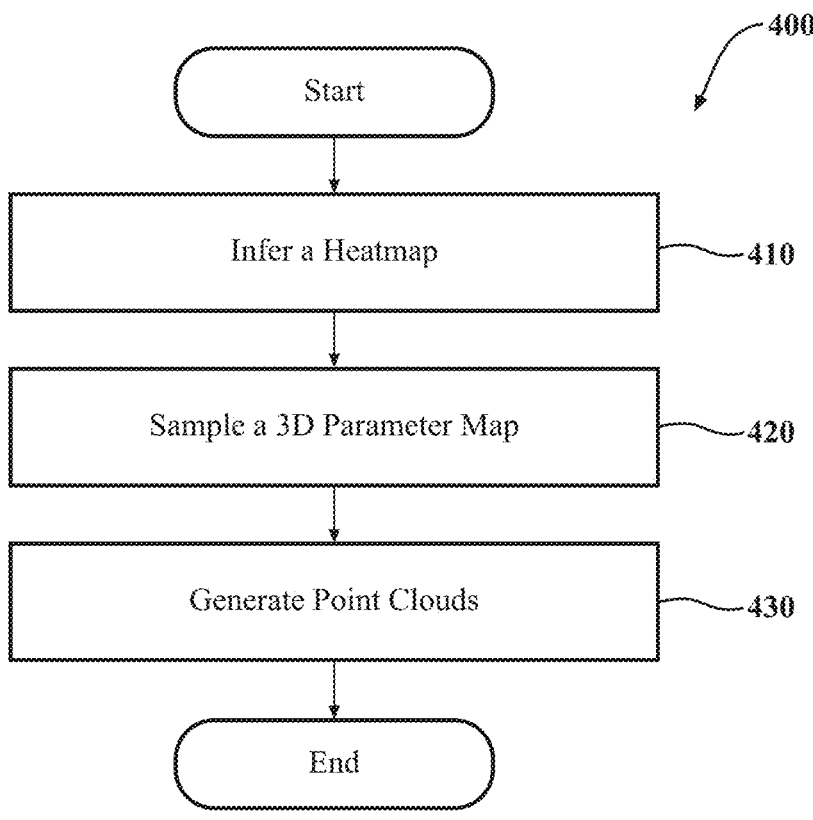
FIG. 4 illustrates one embodiment of a method associated with single-shot multi-object 3D shape reconstruction and categorical 6D pose and size estimation.

Additional aspects of the 6D pose and size estimator system 170 will be discussed in relation to FIG. 4. FIG. 4 illustrates a flowchart of a method 400 that is associated with single-shot multi-object three-dimensional (3D) shape reconstruction and categorical six-dimensional (6D) pose and size estimation. Method 400 will be discussed from the perspective of the 6D pose and size estimator system 170 of FIGS. 1 and 2. While method 400 is discussed in combination with the 6D pose and size estimator system 170, it should be appreciated that the method 400 is not limited to being implemented within the 6D pose and size estimator system 170 but is instead one example of a system that may implement the method 400.

At step 410, the 6D pose and size estimator module 220 infers the heatmap 268 based upon the feature pyramid 264, where the feature pyramid 264 is generated based upon the RGB-D image 252. It is contemplated that the RGB-D image 252 includes objects. According to some embodiments, the 6D pose and size estimator module 220 causes the camera 126 of the robotic device 100 to capture the RGB-D image 252.

At step 420, the 6D pose and size estimator module 220 samples the 3D parameter map 280 at locations corresponding to peaks in the heatmap 268, where the 3D parameter map 280 is inferred based upon the feature pyramid 264, and where the locations include the latent shape codes 282, the 6D poses 284, the 1D scales 286.

At step 430, the 6D pose and size estimator module 220 generates the point clouds 288 based upon the latent shape codes 282, the 6D poses 284, and/or the 1D scales 286. In an example, the point clouds 288 are indicative of the shapes, sizes, and poses (i.e., 6D pose) of the objects in the RGB-D image 252. According to embodiments, the robotic device 100 is controlled based upon the point clouds 288. According to embodiments, the 6D pose and size estimator module 220 applies textures to the point clouds 288 to recreate simulated versions of the objects in the RGB-D image 252. According to embodiments, the 6D pose and size estimator module 220 utilizes the point clouds 288 in a computer simulation to represent simulated versions of the objects. According to embodiments, the 6D pose and size estimator module 220 trains a machine learning model based upon the computer simulation, wherein a real-world robotic device (e.g., the robotic device 100) utilizes the machine learning model to navigate about a real-world environment.

FIG. 1 will now be discussed as an example environment within which the system and methods disclosed herein may operate. As mentioned before, the robotic device 100 can be any type of robotic device, such as a robotic manipulator, autonomous vehicle, and the like.

In the case that the robotic device 100 is a robotic manipulator, the robotic device 100 may include one or more arm(s) 142, joint(s) 143, link(s) 144, effector(s) 145, wrist(s) 146, and the like. The robotic device 100 may be capable of movement and may also include a propulsion system 147. The arm(s) 142, joint(s) 143, link(s) 144, effector(s) 145, wrist(s) 146, and/or the propulsion system 147 may require the use of one or more actuators 141 that cause the movement of any of these items allowing the robotic device 100 to perform a specified task.

The actuators 141 can be any element or combination of elements operable to modify, adjust and/or alter one or more of the robotic device systems 140 or components thereof to be responsive to receiving signals or other inputs from the processor(s) 110. Any suitable actuator can be used. For instance, the one or more actuators 150 can include motors, pneumatic actuators, hydraulic pistons, relays, solenoids, and/or piezoelectric actuators, just to name a few possibilities.

In the case that the robotic device 100 is a vehicle, the robotic device may include numerous vehicle systems, such as braking systems, steering systems, throttle systems, transmission systems, signaling systems, and/or navigation systems, and the like. If the robotic device 100 is a vehicle, the robotic device 100 may be an autonomous vehicle. As used herein, "autonomous vehicle" refers to a vehicle that operates in an autonomous mode. "Autonomous mode" refers to navigating and/or maneuvering the vehicle along a travel route using one or more computing systems to control the vehicle with minimal or no input from a human driver. In one or more embodiments, the vehicle is highly automated or completely automated. In one embodiment, the vehicle is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the robotic device 100 along a travel route.

The robotic device 100 can include one or more processor(s) 110. In one or more arrangements, the processor(s) 110 can be the main processor of the robotic device 100. For instance, the processor(s) 110 can be an electronic control unit (ECU). The robotic device 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information regarding the environment in which the robotic device 100 operates. For example, if the robotic device 100 is a robotic manipulator utilized in a household, the map data 116 may include a map of the household in which the robotic device 100 operates. If the robotic device 100 is a vehicle, the map data 116 may include Data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, including factory/building floors, paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include furniture, industrial machines, household appliances, trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the robotic device 100 is equipped with, including the capabilities and other information about such sensors. As will be explained below, the robotic device 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data store(s) 115 located onboard the robotic device 100. Alternatively, or in addition, at least a portion of the map data 116 and/or the sensor data 119 can be located in one or more data store(s) 115 that are located remotely from the robotic device 100.

As noted above, the robotic device 100 can include the sensor system 120. The sensor system 120 can include one or more sensors. "Sensor" means any device, component, and/or system that can detect and/or sense something. The one or more sensors can be configured to detect and/or sense in real-time. As used herein, the term "real-time" means a level of processing responsiveness that a user or system senses as sufficiently immediate for a particular process or determination to be made or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the robotic device 100 (including any of the elements shown in FIG. 1). The sensor system 120 can acquire data of at least a portion of the external environment of the robotic device 100.

The sensor system 120 can include any suitable type of sensor. Various examples of different types of sensors will be described herein. However, it will be understood that the embodiments are not limited to the particular sensors described. The sensor system 120 can include one or more robotic device sensor(s) 121. The robotic device sensor(s) 121 can detect, determine, and/or sense information about the robotic device 100 itself. In one or more arrangements, the robotic device sensor(s) 121 can be configured to detect, and/or sense position and orientation changes of the robotic device 100, such as, for example, based on inertial acceleration. In one or more arrangements, the robotic device sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The robotic device sensor(s) 121 can be configured to detect, and/or sense one or more characteristics of the robotic device 100. In one or more arrangements, the robotic device sensor(s) 121 can include a speedometer to determine the current speed of the robotic device 100.

Alternatively, or in addition, the sensor system 120 can include one or more environment sensors 122 configured to acquire and/or sense environment data. "Environment data" includes data or information about the external environment in which a robotic device 100 is located or one or more portions thereof. For example, the one or more environment sensors 122 can be configured to detect, quantify, and/or sense obstacles in at least a portion of the external environment of the robotic device 100 and/or information/data about such obstacles. Such obstacles may be stationary objects and/or dynamic objects. The one or more environment sensors 122 can be configured to detect, measure, quantify and/or sense other things in the external environment of the robotic device 100.

Various examples of sensors of the sensor system 120 will be described herein. The example sensors may be part of the one or more environment sensors 122 and/or the one or more robotic device sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras, and/or stereo cameras. According to embodiments, the one or more cameras 126 include an RGB-D camera that is configured to capture RGB-D images.

The robotic device 100 can include an input system 130. An "input system" includes any device, component, system, element or arrangement, or groups thereof that enable information/data to be entered into a machine. The input system 130 can receive an input from an operator of the robotic device 100. The robotic device 100 can include an output system 135. An "output system" includes any device, component, arrangement, or groups thereof that enable information/data to be presented to an operator of the robotic device 100.

The processor(s) 110 can be operatively connected to communicate with the various robotic device systems 140 and/or individual components thereof. For example, returning to FIG. 1, the processor(s) 110 can be in communication to send and/or receive information from the various robotic device systems 140 to control the movement, speed, maneuvering, heading, direction, etc. of the robotic device 100. The processor(s) 110 may control some or all of these robotic device systems 140 and, thus, may be partially or fully autonomous.

The processor(s) 110 can be operatively connected to communicate with the various robotic device systems 140 and/or individual components thereof. For example, returning to FIG. 1, the processor(s) 110 can be in communication to send and/or receive information from the various robotic device systems 140 to control the movement, speed, maneuvering, heading, direction, etc. of the robotic device 100. The processor(s) 110 may control some or all of these robotic device systems 140.

The robotic device 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but is not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. For example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A computing system for single-shot multi-object three-dimensional (3D) shape reconstruction and categorical six-dimensional (6D) pose and size estimation, the computing system comprising:
    a processor; and
    memory communicably coupled to the processor that stores instructions that, when executed by the processor, cause the processor to:
        infer a heatmap based upon a feature pyramid, wherein the feature pyramid is generated based upon a red green blue depth (RGB-D) image that includes objects;
        infer a three-dimensional (3D) parameter map based upon the feature pyramid;
        sample a 3D parameter map at locations corresponding to peaks in the heatmap, wherein the locations include latent shape codes, 6D poses, and one-dimensional (1D) scales; and
        generate point clouds based upon the latent shape codes, the 6D poses, and the 1D scales.

2. The computing system of claim 1, wherein the point clouds are indicative of shapes of the objects, sizes of the objects, and poses of the objects.

3. The computing system of claim 1, wherein the instructions further cause the processor to:
    utilize the point clouds in a computer simulation; and
    train a machine learning model based upon the computer simulation or real-world data, wherein a real-world vehicle utilizes the machine learning model to navigate about a real-world environment.

4. The computing system of claim 1, wherein the instructions further cause the processor to:
    generate, by way of a residual neural network and based upon the RGB-D image, RGB features, and depth features;
    concatenate the RGB features and the depth features to generate concatenated features;
    provide the concatenated features as input to a feature pyramid network (FPN) backbone; and
    obtain the feature pyramid as an output of the FPN backbone.

5. The computing system of claim 1, wherein the instructions further cause the processor to:

train an encoder-decoder network based upon computer-aided design (CAD) models that are indicative of different shapes.

6. The computing system of claim 5, wherein the instructions further cause the processor to:

prior to training the encoder-decoder network, sample points from a CAD model in the CAD models, wherein the points are indicative of a shape; and apply a scaling transform to the points such that the points are centered at an origin and unit normalized.

7. The computing system of claim 6, wherein the instructions for generating the point clouds based upon the latent shape codes, the 6D poses, and the 1D scales comprise further instructions that cause the processor to:

provide the latent shape codes as input to a decoder of the encoder-decoder network;

obtain initial point clouds as output of the decoder; and transform the initial point clouds using the 6D poses and the 1D scales to generate the point clouds.

8. A non-transitory computer-readable medium for single-shot multi-object three-dimensional (3D) shape reconstruction and categorical six-dimensional (6D) pose and size estimation and including instructions that, when executed by a processor, cause the processor to:

infer a heatmap based upon a feature pyramid, wherein the feature pyramid is generated based upon a red green blue depth (RGB-D) image that includes objects;

infer a three-dimensional (3D) parameter map based upon the feature pyramid;

sample a 3D parameter map at locations corresponding to peaks in the heatmap, wherein the locations include latent shape codes, 6D poses, and one-dimensional (1D) scales; and generate point clouds based upon the latent shape codes, the 6D poses, and the 1D scales.

9. The non-transitory computer-readable medium of claim 8, wherein the instructions for generating the point clouds based upon the latent shape codes, the 6D poses, and the 1D scales comprise further instructions that cause the processor to:

provide the latent shape codes as input to a decoder of an encoder-decoder network;

obtain initial point clouds as output of the decoder; and transform the initial point clouds using the 6D poses and the 1D scales to generate the point clouds.

10. The non-transitory computer-readable medium of claim 9, wherein the 6D poses comprise translation vectors and rotation matrices, and wherein the instructions for transforming the initial point clouds using the 6D poses and the 1D scales comprise further instructions that cause the processor to:

multiply points in the initial point clouds by respective translation vectors, respective rotation matrices, and respective 1D scales to generate the point clouds.

11. The non-transitory computer-readable medium of claim 8, wherein the peaks in the heatmap correspond to centers of the objects in the RGB-D image.

12. The non-transitory computer-readable medium of claim 8, wherein the instructions further cause the processor to:

utilize the point clouds in a computer simulation; and train a machine learning model based upon the computer simulation, wherein a real-world robotic device utilizes the machine learning model to navigate about a real-world environment.

13. A method comprising:

inferring a heatmap based upon a feature pyramid, wherein the feature pyramid is generated based upon a red green blue depth (RGB-D) image that includes objects;

inferring a three-dimensional (3D) parameter map based upon the feature pyramid;

sampling a 3D parameter map at locations corresponding to peaks in the heatmap, wherein the locations include latent shape codes, 6D poses, and one-dimensional (1D) scales; and generating point clouds based upon the latent shape codes, the 6D poses, and the 1D scales.

14. The method of claim 13, wherein the point clouds are indicative of shapes of the objects, sizes of the objects, and poses of the objects.

15. The method of claim 13, further comprising:

determining the peaks in the heatmap, wherein the peaks correspond to centers of the objects in the RGB-D image.

16. The method of claim 13, further comprising:

capturing the RGB-D image using a camera of a robotic device; and controlling the robotic device based upon the point clouds.

17. The method of claim 13, further comprising:

utilizing the point clouds in a computer simulation; and training a machine learning model based upon the computer simulation, wherein a real-world robotic device utilizes the machine learning model to navigate about a real-world environment.

18. The method of claim 13, further comprising:

applying textures to the point clouds, wherein the textures correspond to types of the objects.

* * * * *